US005305216A

United States Patent [19]

Okura et al.

[11] Patent Number: 5,305,216

[45] Date of Patent: Apr. 19, 1994

[54] EVENT DETECTOR USED VEHICLE CONTROL APPARATUS

[75] Inventors: Kazuma Okura; Akito Yamamoto, both of Kanagawa, Japan

[73] Assignee: Nissan Motor Co., Ltd., Yokohama, Japan

[21] Appl. No.: 784,937

[22] Filed: Oct. 31, 1991

[30] Foreign Application Priority Data

Nov. 1, 1990 [JP] Japan .................................. 2-293585

[51] Int. Cl.[5] .................................................. G06F 7/70

[52] U.S. Cl. ........................... 364/424.01; 364/424.03; 364/424.04; 123/480; 123/352

[58] Field of Search .............. 364/424.01, 550, 431.04, 364/431.12, 424.03; 123/357, 352, 358, 359, 492, 480, 493

[56] References Cited

U.S. PATENT DOCUMENTS

| | | | |
|---|---|---|---|
| 4,130,095 | 12/1978 | Bowler et al. | 123/32 |
| 4,277,772 | 7/1981 | Kastura et al. | 340/52 |
| 4,493,303 | 1/1985 | Thompson et al. | 123/357 |
| 4,839,835 | 6/1989 | Hagenbuch | 364/567 |
| 4,980,845 | 12/1990 | Govekar | 364/550 |

FOREIGN PATENT DOCUMENTS

| | | |
|---|---|---|
| 54-58116 | 10/1977 | Japan . |
| 55-60639 | 5/1980 | Japan . |
| 55-134732 | 10/1989 | Japan . |

OTHER PUBLICATIONS

IEEE Transactions on Software Engineering, vol. SE-6, No. 1, Jan. 1980, pp. 2-12 "Software Requirements for Complex Systems: New Techniques and Their Application".

*Primary Examiner*—Thomas G. Black
*Assistant Examiner*—Jacques H. Louis-Jacques
*Attorney, Agent, or Firm*—Lowe, Price, LeBlanc & Becker

[57] ABSTRACT

A vehicle control apparatus comprises various sensors sensitive to vehicle operating parameters for producing signals having values sensed for the respective vehicle operating parameters. The vehicle control apparatus also comprises a transition detector. The transition detector includes a memory for storing threshold values specified for the respective vehicle operating parameters, and a comparator for comparing the sensed values with the respective threshold values in a predetermined sequence to sense a transition in one of the vehicle operating parameters when the value sensed for the one vehicle operating parameter is in a range defined by the threshold value specified for the one vehicle operating parameter. The transition detector is coupled to a control unit for controlling the automotive vehicle for the sensed transition.

7 Claims, 3 Drawing Sheets

EVENT DETECTOR USED VEHICLE CONTROL APPARATUS

BACKGROUND OF THE INVENTION

This invention relates to an apparatus for controlling an automotive vehicle and, more particularly, to a vehicle control apparatus employing an event detector for detecting an event defined by one or more transistions. The term "transition" as used through this invention is intended to mean "a specified condition for each of selected vehicle operating parameters". For example, an "engine speed" transition occurs when the measured engine speed value exceeds a threshold value specified therefor. A "throttle position" transition occurs when the throttle switch moves from its on position to its off position. The term "event" as used throughout this invention is intended to mean "a vehicle operating condition change requiring a specified control". An event is defined or determined by a single transition or a plurality of transitions. For example, an "acceleration" event may be defined by a single transition which occurs when the idle switch moves from its on position to its off position. Another event may be defined when three transitions occur, that is, when the engine speed is greater than a threshold value specified therefor, when the engine coolant temperature is greater than a threshold value specified therefor and when the throttle switch moves from its on position to its off position. This sense of term "event" is found in an article published January 1980, in IEEE Transactions on Software Engineering, Vol. SE-6, No. 1, entitled "Specifying Software Requirements for Complex System: New Techniques and Their Applications".

Micro-computers have been employed in various vehicle control apparatus. Since such conventional vehicle control apparatus are designed to handle each event in a background loop or an interrupt routine entered at uniform intervals of time, however, they have much delay in responding to the event, causing increased pollutant emissions, fuel economy losses, undesirable feelings to the driver, and the like.

SUMMARY OF THE INVENTION

Therefore, it is a main object of the invention to provide an improved vehicle control apparatus which can operate at a rapid response rate with respect to events or vehicle operating condition changes.

There is provided, in accordance with the invention, an apparatus for controlling an automotive vehicle. The vehicle control apparatus comprises means sensitive to vehicle operating parameters for producing signals having values sensed for the respective vehicle operating parameters. The vehicle control apparatus also comprises a transition detector which includes a memory for storing threshold values specified for the respective vehicle operating parameters, and means for comparing the sensed values with the respective threshold values in a predetermined sequence to provide a signal indicative of a sensed transition in one of the vehicle operating parameters when the value sensed for the one vehicle operating parameter is in a range defined by the threshold value specified for the one vehicle operating parameter. The transition detector is coupled to control means for controlling the automotive vehicle for the sensed transition.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
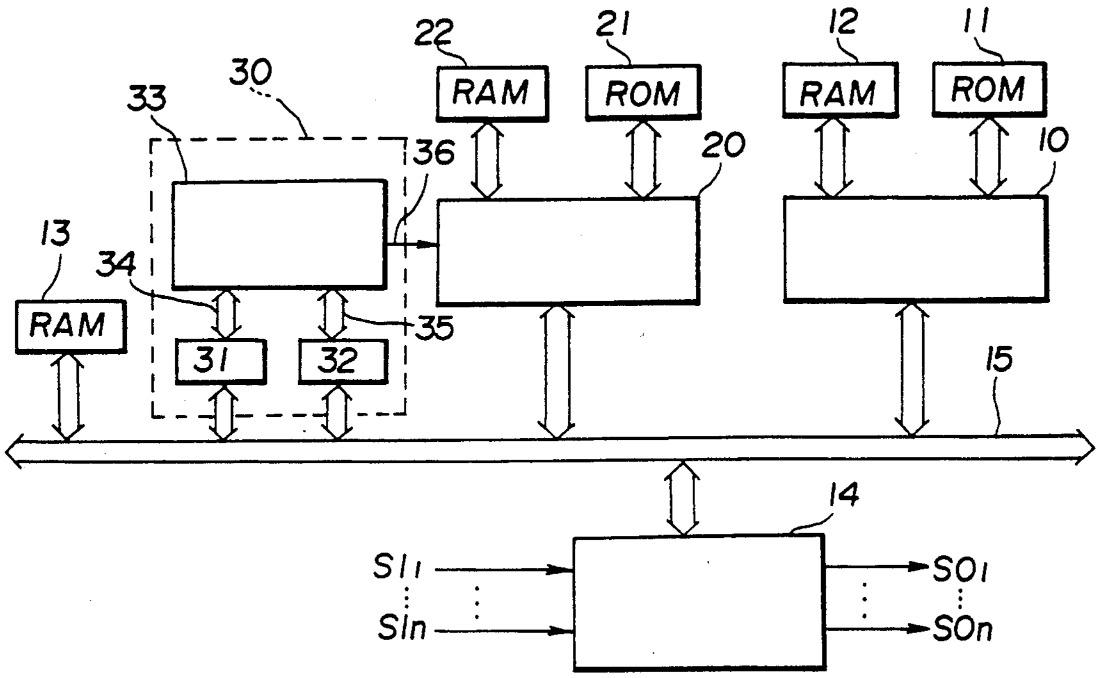
FIG. 1 is a schematic block diagram showing a vehicle control apparatus embodying the invention.

With reference to the drawings, wherein like numerals refer to like parts in the several views, and in particular to FIG. 1, there is shown a schematic block diagram of a vehicle control apparatus embodying the invention. The vehicle control apparatus includes a main processor 10 which communicates with a read only memory (ROM) 11 having a program stored therein for operating the main processor 10 and with a random access memory (RAM) 12 into which data may be read at address locations determined in accordance with the computer program stored in the ROM 11. The main processor 10 communicates through a main bus 15 with a random access memory (RAM) 13 into which data may be read at address locations determined in accordance with the computer program stored in the ROM 11 and also with an input/output control unit (I/O) 14. The input/output control unit 13 receives input signals SI1 to SIn from various sensors. These sensors signals have values sensed for respective selected vehicle operating parameters such as intake airflow, engine speed, engine coolant temperature, throttle valve position, idle switch position, air/fuel ratio, etc. The main processor 10 utilizes these sensor signals for calculating values corresponding to settings of various actuators for controlling the automotive vehicle. The actuators include a fuel injector controller, a spark timing controller, a brake controller, a transmission controller, etc. Control words specifying desired settings of the respective actuators are periodically transferred by the main processor 10 to the input/output control unit 14. The input/output control unit 13 produces control signals SO1 to SOn to the respective actuators for controlling the automotive vehicle.

The vehicle control apparatus also includes an event processor 20 which communicates with a read only memory (ROM) 21 having a program stored therein for operating the event processor 20 and with a random access memory (RAM) 22 into which data may be read at address locations determined in accordance with the computer program stored in the ROM 21. The event processor 20 communicates through the main bus 15 with the main processor 10 and the RAM 13. The event processor 20 has an input terminal for receipt of a transition indication signal from a transition detecting unit 30. The event processor 20 includes an event detector and an event management program for detecting which one of specified events occurs based upon one or more transition indicative signals to produce a signal indicative of the detected event. Normally, an event occurs when a plurality of conditions are fulfilled, that is, when the engine speed is greater than a predetermined value, when the engine coolant temperature is greater than a predetermined value, and when the throttle switch is turned off. Thus, the event detector may be arranged to produce the event signal when a plurality of specified transitions are sensed in a predetermined sequence. If a single transition forms an event, for example, a change of the idle switch from its on state to its off state forms an "acceleration" event, an event indication signal is produced as soon as a transition indication signal occurs. In this case, the event processor 20 may be removed. The event indicative signal is fed from the event processor 20 to the main processor 10 which thereby takes a step suitable for the detected event.

The transition detecting unit 30 includes first and second memories 31 and 32 and a transition detector 33. The first memory 31, which is of the dual port type having an input port connected to the main bus 15 and an output port connected to the transition detector 33, has measured data stored therein. The measured data include values measured or sensed for the respective vehicle operating parameters. The second memory 32, which is of the dual port type having an input port connected to the main bus 15 and an output port connected to the transition detector 33, has threshold data stored therein. The threshold data include threshold values specified for the respective vehicle operating parameters. The transition detector 33 compares the sensed values with the respective threshold values in a predetermined sequence to make a check as to whether or not a transition occurs in each of the selected vehicle operating parameters. The sensed value is fed to the transition detector 33 through a line 34 from the first memory 21, whereas the threshold value is fed to the transition detector 33 through a line 35 from the second memory 22. The transition detector 33 produces a signal indicative of a transition in one of the selected vehicle operating parameters when a value sensed for the one vehicle operating parameter is in a range defined by a threshold value specified for the one vehicle operating parameter, that is, when the sensed value exceeds the threshold value. It is to be understood that, for some vehicle operating parameters, the transient indicative signal is produced when the sensed value is less than the threshold value. Similar operations are repeated in a predetermined sequence for all of the selected vehicle operating parameters. The transition indicative signal is fed through a line 36 to the event processor 20.

Figure 2:
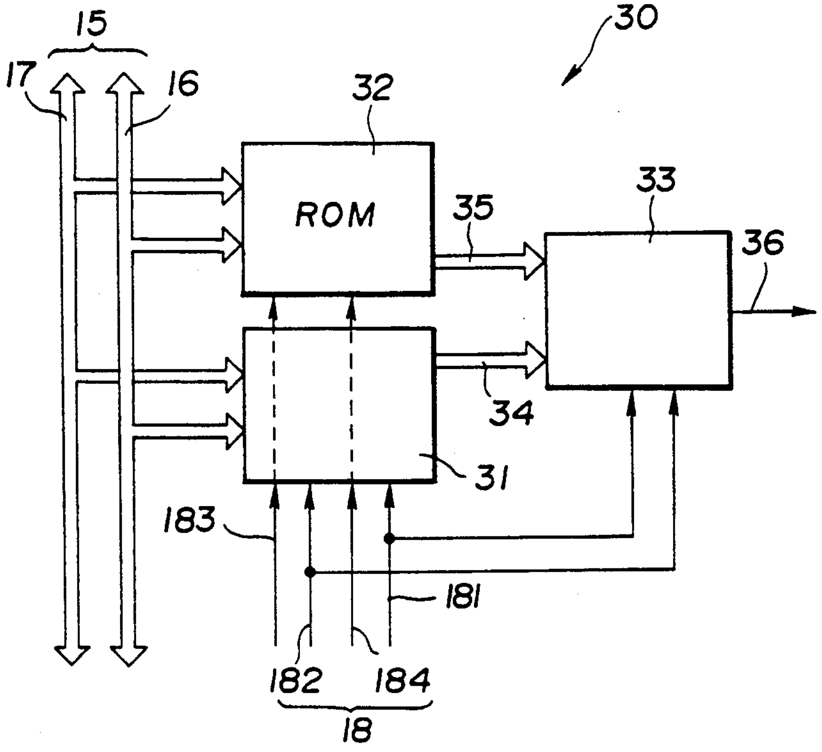
FIG. 2 is a schematic block diagram showing a transition detecting unit used in the vehicle control apparatus of FIG. 1.

Referring to FIG. 2, the transition detecting unit 30 communicates with the main processor 10 through the main bus 15. The main bus 15 is comprised of a data bus 16, an address bus 17 and a control bus 18. The control bus 18 includes four lines 181, 182, 183 and 184 through which selection, write and read signals are fed from the main processor 10 to the transition detecting unit 30.

The first memory 31 is taken in the form of a random access memory (RAM) connected through the control lines 181, 182 and 183 to the main processor 10. The selection signal SC1 fed through the control line 181 permits the main processor 10 to access the RAM 31. The write signal SC2 fed through the control line 182 permits the main processor 10 to store a sensed vehicle operating parameter value transferred through the data bus 16 in the RAM 31 at an address location specified through the address bus 17. The read signal SC3 fed through the control line 183 permits the main processor 10 to read a sensed vehicle operating parameter value stored in the RAM 31 at an address location specified through the address bus 17.

The second memory 32 is taken in the form of a read only memory (ROM) connected through the control lines 183 and 184 to the main processor 10. The selection signal SC4 fed through the control line 184 permits the main processor 10 to access the ROM 32. The read signal SC3 fed through the control line 183 permits the main processor 10 to read a threshold value stored in an address location of the RAM 31 specified through the address bus 17. The read threshold value is fed through the line 35 to the transition detector 33.

When the main processor 10 transfers a value sensed for one of the vehicle operating parameters through the data bus 16 and specifies an address location through the address bus 17 in the presence of the control signals SC1, SC2, SC3 and SC4 on the respective control lines 181, 182, 183 and 184, the sensed value is stored at the specified address location of the RAM 31 and fed through the line 34 to the transition detector 33, whereas a threshold value stored at the specified address location of the ROM 32 is read and fed through the line 35 to the transition detector 33. The fed threshold value is predetermined for the one vehicle operating parameter. Thus, the RAM and ROM 31 and 32 should have the same address locations assigned to one selected vehicle operating parameter. This means that the main processor 10 can specify an address location through the address bus 17 to permit the transition detector 33 to receive a value sensed for one of the vehicle operating parameters and a threshold value specified for the one vehicle operating parameter. The transition detector 33 compares the fed vehicle operating parameter value with the fed threshold value to make a decision as to whether or not a transition occurs in the vehicle operating parameter. The transition detector 33 produces a transient indicative signal on the output line 36 when the sensed vehicle operating parameter value is in a range defined by the threshold value.

Figure 3:
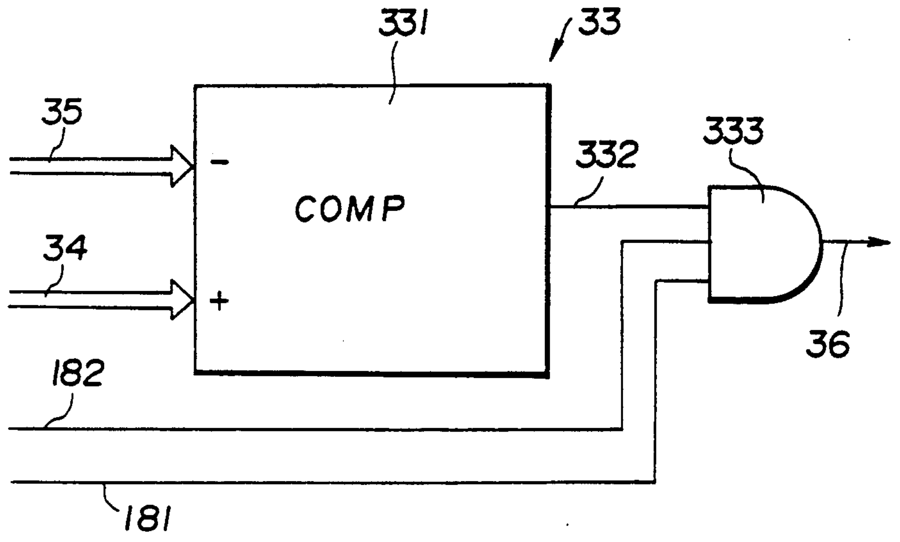
FIG. 3 is a schematic block diagram showing a transition detector used in the transition detecting unit of FIG. 2.

Referring to FIG. 3, the transition detector 33 includes a single comparator 331 having an input connected through the line 34 to the RAM 31 and another input connected through the line 35 to the ROM 32. The comparator 331 compares the value sensed for one of the vehicle operating parameters with the threshold value specified for the one vehicle operating parameter to produce a high output on its output line 332 when the sensed value exceeds the threshold value. The transition detector 33 also includes an AND gate 333 having an input coupled to the output of the comparator 331 through the output line 332. The AND gate 333 has additional inputs connected to the control lines 181 and 182. Thus, the AND gate 333 produces a transition indicative signal in the form of a high output when the output of the comparator 331 is high in the presence of the selection and write signals SC1 and SC2.

The operation is as follows: The main processor 10 monitors vehicle operating parameters and transfers the values sensed for the respective vehicle operating parameters in a predetermined sequence to the first memory 31. In order to make a check for a transition in one of the selected vehicle operating parameters (for example, engine speed), the main processor 10 produces the control signals SC1 to SC4 through the control bus 18, transfers a value sensed for the one vehicle operating parameter (engine speed) through the data bus 16 and specifies an address location A assigned for the one vehicle operating parameter (engine speed) through the address bus 17. The sensed value is stored in the first memory 31 at the specified address location A and fed through the line 34 to the comparator 331. At the same time, a threshold value (for example, 1000 rpm) stored at the specified address location A of the second memory 32 is read and fed to the comparator 331. The threshold value specified for one of the one vehicle operating parameters is stored at the same address location as the address location assigned for the one vehicle operating parameter in the first memory 31. The comparator 331 compares the value sensed for the one vehicle operating parameter (engine speed) with the threshold value (1000 rpm) specified for the one vehicle operating parameter. When the sensed value is equal to or greater than the threshold value, the comparator 331 produces a high output signal causing the AND gate 333 to produce a signal indicative of a transition in the one vehicle operating parameter (engine speed). When the sensed value is less than the threshold value, the comparator 331 produces a low output signal causing the AND gate 333 to produce no transition indicative signal on the output line 36. The transition indicative signal is fed through the line 36 to the event processor 20. The event processor 20 detects which one of the vehicle operating parameters the transient indication signal is related to based upon the address location specified through the address bus 17. Similar operations are repeated for all of the selected vehicle operating parameters. The event processor 20 detects which one of selected events occurs based upon a single or plural transition signals fed thereto from the transition detecting unit 30. For example, an "acceleration" event is detected in response to an "idle switch" transition which occurs when the idle switch moves from its on position to its off position. Another event may be detected in response to three transitions, that is, when the engine speed is greater than its threshold value, when the engine coolant temperature is greater than its threshold value, and when the throttle switch moves from its on position to its off position. The event processor 20 produces a signal indicative of a detected event to the main processor 10 which thereby performs a vehicle control specified for the detected event.

Each time the main processor 10 transfers a value sensed for one of the selected vehicle operating parameters to the first memory 31, the transition detector 33 produces the result of a decision as to whether or not a transition occurs in the one vehicle operating parameter. It is, therefore, possible to provide an extremely fast response to a transient and thus to an event.

Figure 4:
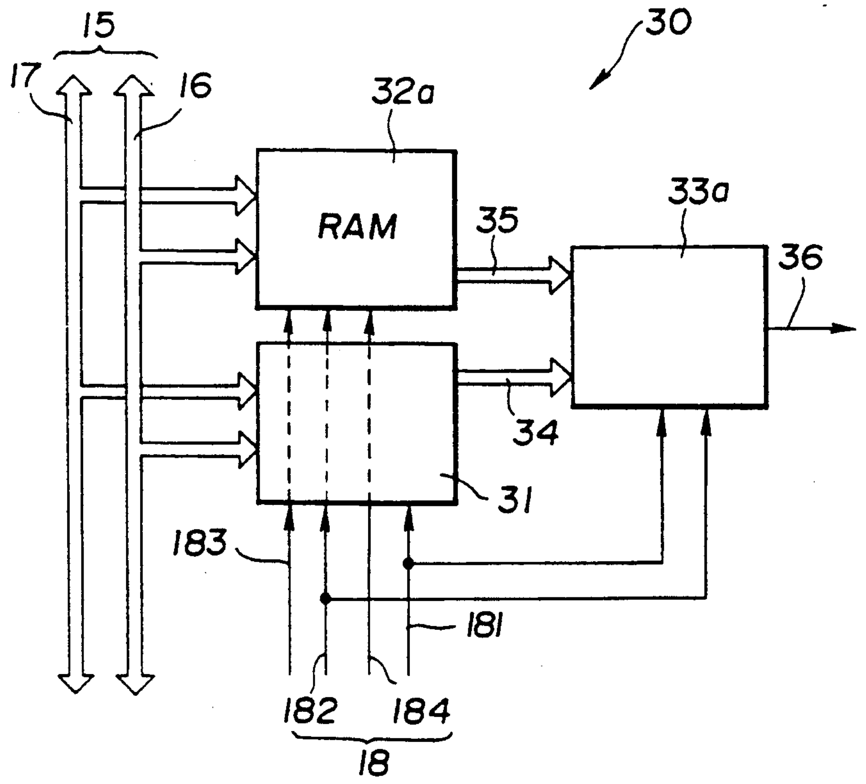
FIG. 4 is a schematic block diagram showing a modified form of the transition detecting unit of FIG. 2.

Referring to FIG. 4, there is shown a modified form of the embodiment of FIG. 2 with the same parts being designated by the same reference numerals. In this embodiment, the second memory is taken in the form of a random access memory (RAM) 32*a* to permit the data stored therein to be rewritten. The RAM 32*a* has a threshold and sign value stored therein at each of the address locations assigned to the respective vehicle operating parameters. The sign value has a first or second level "0" or "1" to indicate whether a transition occurs in the corresponding one of the vehicle operating parameters when the value sensed for the one operating parameter value is greater than the threshold value specified for the one vehicle operating parameter or when the sensed value is less than the threshold value. A sign value "0" indicates that a transition occurs in the corresponding vehicle operating parameter when the sensed value is greater than the threshold value. A sign value "1" indicates that a transition occurs in the corresponding vehicle operating parameter when the sensed value is less than the threshold value.

When the main processor 10 transfers a value sensed for one of the vehicle operating parameters through the data bus 16 and specifies an address location through the address bus 17 in the presence of the control signals SC1, SC2, SC3 and SC4 on the respective control lines 181, 182, 183 and 184, the sensed value is stored in the specified address location of the RAM 31 and fed through the line 34 to the transition detector 33*a*, whereas threshold and sign values stored in the specified address location of the RAM 32*a* are read and fed through the line 35 to the transition detector 33*a*.

Figure 5:
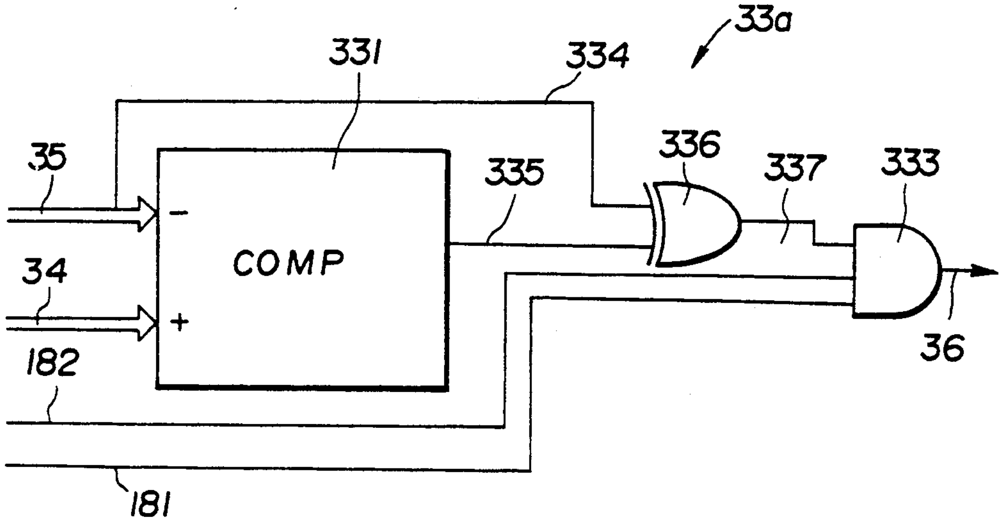
FIG. 5 is a schematic block diagram showing a transition detector used in the transition detecting unit of FIG. 4.

Referring to FIG. 5, the transition detector 33*a* includes a single comparator 331 having an input connected through the line 34 to the RAM 31 and another input connected through the line 35 to the RAM 32*a*. The comparator 331 compares the sensed vehicle operating parameter value fed thereto through the line 34 with the threshold value fed thereto through the line 35. The comparator 331 produces a high output signal on its output line 335 when the sensed value is equal to or greater than the threshold value and a low output signal on the line 335 when the sensed value is less than the threshold value. The output line 335 is connected to an input of an exclusive OR gate 336 having another input connected through a line 334 to the line 35. The exclusive OR gate 336 has an output connected through a line 337 to the first input of the AND gate 333. The second and third inputs of the AND gate 333 are connected to the respective control lines 181 and 182. The output of the AND gate 333 is connected to the line 36.

The operation is as follows: The main processor 10 monitors selected vehicle operating parameters and transfers the values sensed for the respective vehicle operating parameters in a predetermined sequence to the RAM 31. In order to check a transition in one of the vehicle operating parameters (for example, engine speed), the main processor 10 produces the control signals SC1 to SC4 through the control bus 18, transfers a value sensed for the one vehicle operating parameter (engine speed) through the data bus 16, and specifies an address location A assigned for the one vehicle operating parameter (engine speed) through the address bus 17. The sensed value is stored in the specified address location A of the RAM 31 and fed through the line 34 to the comparator 331. At the same time, a threshold value (for example, 1000 rpm) stored in the specified address location A of the RAM 32*a* is read and fed through the line 35 to the comparator 331 and a sign value (for example, "0") stored in the specified address location A of the RAM 32*a* is read and fed through the lines 35 and 334 to the exclusive OR gate 336. The comparator 331 compares the value sensed for the one vehicle operating parameter (engine speed) with the threshold value (1000 rpm) specified for the one vehicle operating parameter (engine speed). When the sensed value is equal to or greater than the threshold value, the comparator 331 produces a high output signal to the exclusive OR gate 336. The exclusive OR gate 336 inverts the signal received at one input, such as the line 335, when the other input (334) is held high or one. Since the sign value fed from the RAM 32*a* to the exclusive OR gate 336 is "0", the exclusive OR gate 336 passes the high level signal fed from the comparator 331 as it is, causing the AND gate 333 to produce a signal indicative of a transition in the one vehicle operating parameter (engine speed). When the sensed value is less than the threshold value, the comparator 331 produces a low level signal which is fed through the exclusive OR gate 336 as it is, causing the AND gate 333 to produce no transition indicative signal on the output line 36. The transition indicative signal is fed through the line 36 to the event processor 20. The event processor 20 detects which one of the vehicle operating parameters the transient indication signal is related to based upon the address location specified through the address bus 17. Similar operations are repeated for all of the selected vehicle operating parameters. The event processor 20 detects which one of selected events occurs based upon a single or plural transition signals fed thereto from the transition detecting unit 30. The event processor 20 produces a signal indicative of a detected event to the main processor 10 which thereby performs a vehicle control specified for the detected event.

If the sign value fed from the RAM 32*a* to the exclusive OR gate 336 is "1", the exclusive OR gate 336 produces a high level signal causing the AND gate 333 to produce a transition indicative signal to the event processor 20 when the sensed value is less than the threshold value. It is, therefore, possible to arrange the transition detecting unit 30 to produce a transition indicative signal when the value sensed for the one vehicle operating parameter (engine speed) is less than the threshold value (1000 rpm) specified for the one vehicle operating parameter (engine speed) by producing commands from the main processor 10 through the data, address and control buses to rewrite the sign value stored in the corresponding address location of the RAM 32*a* from "0" to "1".

Figure 6:
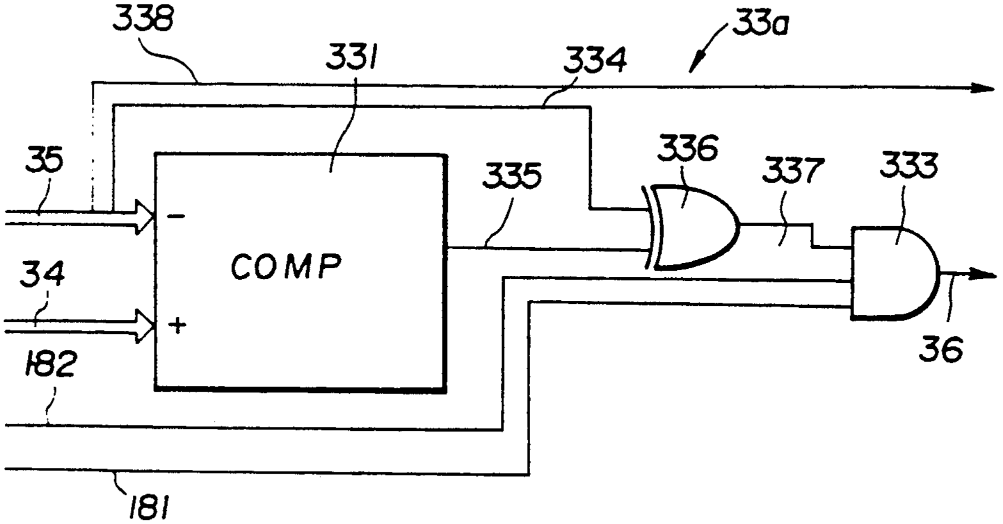
FIG. 6 is a schematic block diagram showing a modified form of the transition detector of FIG. 5.

Referring to FIG. 6, there is shown a modified form of the transition detector 33*a*. In this modification, the RAM 32*a* (FIG. 4) stores an action code together with a threshold and sign value at each of the address locations assigned to the respective vehicle operating parameters. When the main processor 10 produces the control signals SC1 to SC4 through the control bus 18, transfers a value sensed for one of the selected vehicle operating parameters through the data bus 16 and specifies an address location A assigned for the one vehicle operating parameter through the address bus 17, the sensed value is stored in the specified address location A of the RAM 31 and fed through the line 34 to the comparator 331. At the same time, a threshold value stored in the specified address location A of the RAM 32*a* is read and fed through the line 35 to the comparator 331, a sign value stored in the specified address location A of the RAM 32*a* is read and fed through the lines 35 and 334 to the exclusive OR gate 336, and an action code stored in the specified address location A of the RAM 32*a* is read and fed through the lines 35 and 338 to one of the main and event processors 10 and 20. The transition detector 33*a* detects a transition in the one vehicle operating parameter in the same manner as described in connection with FIGS. 4 and 5. The action code indicates an action which is to be performed by either of the main and event processors 10 and 20 when a transition occurs in the one vehicle operating parameter. The action code may indicate an address of a sub-routine program to be executed to perform an action required for the detected transition.

What is claimed is:

1. An apparatus for controlling an automative vehicle, comprising:

first means sensitive to vehicle operating parameters for producing signals having values sensed for the respective vehicle operating parameters;

a transition detector, coupled to said first means, including a first memory for storing predetermined threshold values specified for the respective vehicle operating parameters, and means for comparing the sensed values with the respective threshold values in a predetermined sequence to provide at least one signal indicative of a sensed transition in one of the vehicle operating parameters when the value sensed for the one vehicle operating parameter is in a range defined by a threshold value specified for the one vehicle operating parameter;

an event detector coupled to the transition detector for detecting a specified at least one of said sensed transitions to produce an event signal indicative of a sensed event; and control means responsive to the event signal for controlling the automotive vehicle in response to the sensed event.

2. The vehicle control apparatus as claimed in claim 1, wherein the event detector includes means for producing the event signal when a plurality of specified transitions are sensed in a predetermined sequence.

3. The vehicle control apparatus as claimed in claim 1, wherein the transition detector includes means for producing a command signal specifying an address selected for the one vehicle operating parameter, means responsive to the command signal for reading the threshold value stored at the specified address of the first memory, and means for comparing the value sensed for the one vehicle operating parameter with the read threshold value to provide the transition indicative signal when the sensed value is in a range defined by the read threshold value.

4. The vehicle control apparatus as claimed in claim 3, wherein the transition detector includes a second memory for storing the values sensed for the respective vehicle operating parameters, means responsive to the command signal for writing the value sensed for the one vehicle operating parameter into the specified address of the second memory.

5. The vehicle control apparatus as claimed in claim 1, wherein the comparator including means for sensing the transition when the sensed value is equal to or greater than the threshold value.

6. The vehicle control apparatus as claimed in claim 1, wherein the first memory stores sign values specified for the respective vehicle operating parameters, and wherein the transition detector includes means for producing a command signal specifying an address selected for the one vehicle operating parameter, means responsive to the command signal for reading the threshold value stored at the specified address of the first memory and a sign value stored at the specified address of the first memory, and means for producing the transition indicative signal in response to the sensed value being equal to or greater than the read threshold value when the read sign value has a first level or in response to the sensed value being less than the read threshold value when the read sign has a second level.

7. The vehicle control apparatus as claimed in claim 6, wherein the first memory stores action codes specified for the respective vehicle operating parameters, and wherein the transition detector includes means responsive to the command signal for reading an action code stored in the specified address of the first memory, and means responsive to the transition indicative signal for performing an action indicated by the read action code.

* * * * *